United States Patent
Chung et al.

(10) Patent No.: US 12,493,555 B2
(45) Date of Patent: Dec. 9, 2025

(54) MEMORY CONTROLLER CONTROLLING READ OPERATIONS FOR PREFETCHING DATA AND STORAGE DEVICE INCLUDING THE SAME

(71) Applicant: SK hynix Inc., Gyeonggi-do (KR)

(72) Inventors: Hyun Jin Chung, Gyeonggi-do (KR); Hee Cheol Kim, Gyeonggi-do (KR); Byoung Min Jin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/535,050

(22) Filed: Dec. 11, 2023

(65) Prior Publication Data

US 2025/0013573 A1   Jan. 9, 2025

(30) Foreign Application Priority Data

Jul. 6, 2023   (KR) ................ 10-2023-0087770

(51) Int. Cl.
*G06F 12/0862* (2016.01)
*G06F 12/02* (2006.01)

(52) U.S. Cl.
CPC ........ *G06F 12/0862* (2013.01); *G06F 12/023* (2013.01)

(58) Field of Classification Search
CPC ............... G06F 12/0862; G06F 12/023; G06F 12/0215; G06F 12/0871
See application file for complete search history.

(56) References Cited

U.S. PATENT DOCUMENTS

| | | | |
|---|---|---|---|
| 2002/0095532 A1* | 7/2002 | Surugucchi | G06F 3/0689 710/5 |
| 2011/0246722 A1* | 10/2011 | Taha | G06F 12/0862 711/137 |
| 2014/0101389 A1* | 4/2014 | Nellans | G06F 12/0862 711/137 |
| 2014/0250260 A1* | 9/2014 | Yap | G11C 7/222 711/103 |
| 2022/0269610 A1* | 8/2022 | Lee | G06F 3/0679 |
| 2024/0303193 A1* | 9/2024 | Jin | G06F 12/0806 |

FOREIGN PATENT DOCUMENTS

| | | | |
|---|---|---|---|
| KR | 20180052465 A | | 5/2018 |
| KR | 20220120016 A | | 8/2022 |

* cited by examiner

*Primary Examiner* — Michael Krofcheck
(74) *Attorney, Agent, or Firm* — IP & T GROUP LLP

(57) ABSTRACT

A memory controller capable of improving the performance of a read operation may include: a read command generator for generating read commands instructing a memory device to read, in advance, data to be read-requested from a host; a cache memory for storing data read from the memory device according to the read commands; a read operation controller for receiving, from the cache memory, data corresponding to a read request of the host in response to the read request, and outputting the received data to the host; and a cache memory size controller for controlling a size of the cache memory, based on a size of an area assigned for prefetching data in the data stored in the cache memory and a size of the data corresponding to the read request.

16 Claims, 7 Drawing Sheets

PREFETCH SIZE < I/O SIZE

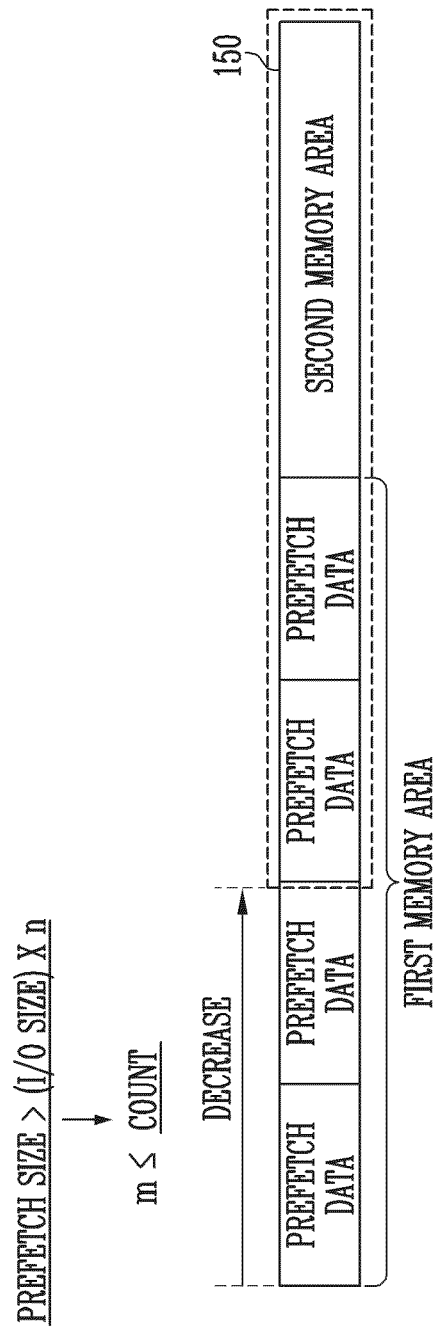

I/O SIZE ≤ PREFETCH SIZE ≤ (I/O SIZE) X n

MEMORY CONTROLLER CONTROLLING READ OPERATIONS FOR PREFETCHING DATA AND STORAGE DEVICE INCLUDING THE SAME

CROSS-REFERENCE TO RELATED APPLICATION

The present application claims priority under 35 U.S.C. § 119(a) to Korean patent application number 10-2023-0087770 filed on Jul. 6, 2023, the entire disclosure of which is incorporated by reference herein.

BACKGROUND

1. Field of Invention

Embodiments of the present disclosure generally relate to a semiconductor device, and more particularly, to a read operation controlled by a memory controller.

2. Description of Related Art

A storage device may be a device which stores data.

The storage device may perform a read operation of reading data stored therein according to a read request of a host. Further, the storage device may prefetch data before the read request is received, based on a read ahead method. A prefetch operation may be an operation of reading data in advance from a memory device and temporarily storing the read data in a cache memory. After that, when any data read-requested from the host exists in the cache memory, the storage device may read the data from the cache memory and output the read data to the host.

SUMMARY

Embodiments of the present disclosure provide a memory controller capable of optimizing a cache memory in which read data is stored in advance, and a storage device including the memory controller.

In accordance with one embodiment of the present disclosure, there is provided a memory controller including: a read command generator configured to generate read commands instructing a memory device to read, in advance, data to be read-requested from a host; a cache memory configured to store data read from the memory device according to the read commands; a read operation controller configured to receive, from the cache memory, data corresponding to a read request of the host in response to the read request, and output the received data to the host; and a cache memory size controller configured to control a size of an area assigned for prefetching data in the cache memory, based on a size of the data stored in the cache memory and a size of the data corresponding to the read request.

In accordance with another embodiment of the present disclosure, there is provided a memory controller including: a read command generator configured to generate read commands instructing a memory device to read, in advance, data to be read-requested from a host; a cache memory configured to store data read from the memory device according to the read commands; and a read operation controller configured to determine whether the read commands are to be generated, based on a size of an area assigned for prefetching data in data being processed according to a plurality of read requests of the host and a size of the cache memory.

In accordance with still another embodiment of the present disclosure, there is provided a storage device including: a memory device configured to store data; a cache memory configured to store data prefetched from the memory device; a read operation controller configured to receive, from the cache memory, data corresponding to a read request of a host in response to the read request, and output the received data to the host; and a memory controller configured to control a size of the cache memory, based on a size of an area assigned for prefetching data in the data stored in the cache memory and a size of the data corresponding to the read request, and determine whether a prefetch operation is to be performed, based on the controlled size of the area in the cache memory.

In accordance with still another embodiment of the present disclosure, there is provided a method of operating a storage device, the method including: controlling a size of an area assigned for prefetching data in a cache memory, based on a size of data stored in the cache memory and a size of data corresponding to a read request of a host; determining whether a size of data being processed according to a plurality of read requests is greater than the controlled size of the area in the cache memory; and generating, according to a determination that the size of the data being processed according to the plurality of read requests is equal to or smaller than the controlled size of the area in the cache memory, read commands to read, in advance, data to be read-requested.

The method of operating the storage device further includes suspending, according to a determination that the size of the data being processed according to the plurality of read requests is greater than the controlled size of the area in the cache memory, the generation of the read commands.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6B is a diagram illustrating an example of decreasing the size of the cache memory in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Figure 1:
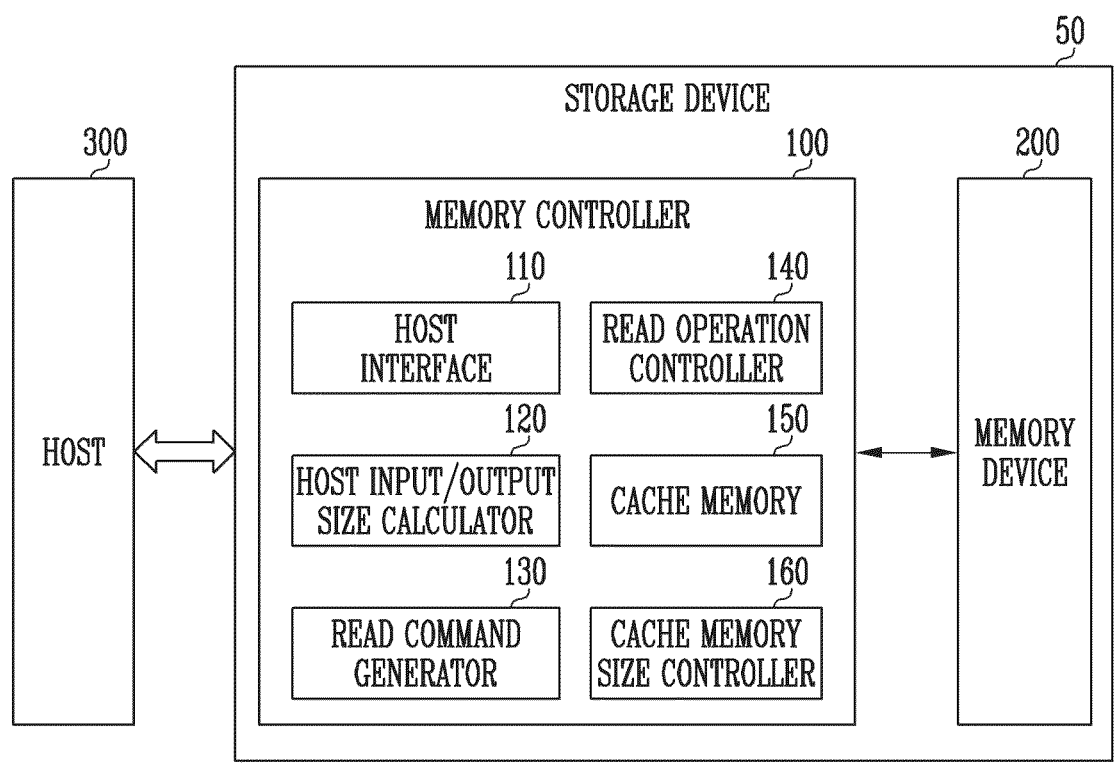
FIG. 1 is a diagram illustrating a storage device in accordance with an embodiment of the present disclosure.

FIG. 1 is a diagram illustrating a storage device 50 in accordance with an embodiment of the present disclosure.

The storage device 50 may be a device which stores or reads data under the control of a host (i.e., an external device) 300.

The storage device 50 may be manufactured as any of various types of storage devices or be manufactured as any of various types of package forms according to a communication scheme with the host 300.

Referring to FIG. 1, the storage device 50 may include a memory controller 100 and a memory device 200.

The memory controller 100 may control operations of the storage device 50.

When power is applied to the storage device 50, the memory controller 100 may execute firmware (FW). When the memory device 200 is a flash memory device, the FW may include a Host Interface Layer (HIL) for controlling communication with the host 300, a Flash Translation Layer (FTL) for controlling communication between the host 300 and the memory device 200, and a Flash Interface Layer (FIL) for controlling communication with the memory device 200.

The memory controller 100 may provide the memory device 200 with a command, an address or data, which correspond to a write operation, a read operation, an erase operation, or the like, to perform a corresponding operation according to a request of the host 300.

In an embodiment, the memory device 200 may include a plurality of memory devices, and the memory controller 100 may be coupled to the plurality of memory devices through a channel. The memory controller 100 may control the plurality of memory devices according to an interleaving scheme to improve operational performance. The interleaving scheme may be a scheme for controlling operations on at least two memory devices to overlap with each other.

In an embodiment, the memory controller 100 may include a host interface 110, a host input/output size calculator 120, a read command generator 130, a read operation controller 140, a cache memory 150, and a cache memory size controller 160.

The host interface 110 may control communication between the host 300 and the memory controller 100. For example, the host interface 110 may drive (execute) the HIL.

In an embodiment, the host interface 110 may receive a write request, a read request, an erase request, or the like from the host 300.

In an embodiment, the host interface 110 may receive data and a Logical Block Address (LBA), which are input from the host 300. The LBA may be translated into a Physical Block Address (PBA) representing addresses of memory cells included in the memory device 200, in which data is to be stored. In this disclosure, the LBA and a "logic address" or "logical address" may be used with the same meaning. In this disclosure, the PBA and a "physical address" may be used with the same meaning.

In an embodiment, the host interface 110 may provide data read from the memory device 200 to the host 300 in response to a read request.

The host input/output size calculator 120 may calculate a size of data being processed according to a plurality of read requests of the host 300.

In an embodiment, the host input/output size calculator 120 may calculate the size of the data being processed according to the plurality of read requests, based on a difference between a size of data corresponding to the plurality of read requests and a size of data output to the host 300 in response to at least one read request among the plurality of read requests. For example, the host input/output size calculator 120 may acquire information on the size of the data corresponding to the plurality of read requests, the size of the data provided to the host 300, and the like through the host interface 110. The host input/output size calculator 120 may calculate a total size of data being currently processed in the storage device 50, based on the information acquired from the host interface 110.

The read command generator 130 may generate read commands instructing a read operation of the memory device 50.

In an embodiment, during a prefetch operation, the read command generator 130 may generate read commands instructing the memory device 200 to read, in advance, data read-requested from the host 300 before a read request is received.

In an embodiment, the data read in advance through the prefetch operation may include a frequency at which the data is read-requested from the host 300, data corresponding to a next a logic address of currently read-requested data according to a sequential read request of the host 300, data expected to be read in advance based on at least a use pattern of the host 300, and the like. In an embodiment, the sequential read request may be a read request for successive data corresponding to sequential addresses.

The read operation controller 140 may control the memory device 200 to perform a read operation.

In an embodiment, when receives a sequential read request from the host 300, the read operation controller 140 may control the read command generator 130 to generate a read command instructing the memory device 200 to read, in advance, data to be read-requested. The read command generator 130 may generate a read command instructing the memory device 200 to read data corresponding to a next logical address of a currently received logical address together with the sequential read request.

In an embodiment, in response to a read request of the host 300, the read operation controller 140 may receive data corresponding to the read request from the cache memory 150, and output the received data to the host 300.

For example, when the data corresponding to the read request exists in the cache memory 150, a cache hit may occur. The read operation controller 140 may output the data stored in the cache memory 150 to the host 300.

The cache memory 150 may store data read in advance from the memory device 200 according to read commands instructing the memory device 200 to read, in advance, data to be read-requested. When the data read-requested from the host 300 exists in the cache memory 150, the data stored in the cache memory 150 may be provided to the host 300 as a response to the read request.

The cache memory size controller 160 may control a size of the cache memory 150, based on a size of data stored in the cache memory 150 and a size of data corresponding to a read request of the host 300. The size of the data stored in the cache memory 150 may represent a size of remaining data other than the data corresponding to the read request, among the data read from the memory device 200. In addition, the data corresponding to the read request may represent data output to the host 300 according to a cache hit.

In an embodiment, the cache memory size controller 160 may decrease, increase or maintain the size of the cache memory 150, so that the size of the cache memory 150 can be optimized to improve the performance of a read operation of the storage device 50.

The memory device 200 may include a memory cell array including a plurality of memory cells in which data is stored.

The memory cell array may include a plurality of memory blocks. Each memory block may include a plurality of memory cells. One memory block may include a plurality of pages. In an embodiment, the page may be a unit for writing (programming) data in the memory device 200 and reading data stored in the memory device 200. The memory block may be a unit for erasing data.

The memory device 200 may receive a command and an address from the memory controller 100, and perform an operation instructed by the command on an area selected by the address in the memory cell array.

The host 300 may communicate with the storage device 50, using at least one of various communication schemes.

Figure 2:
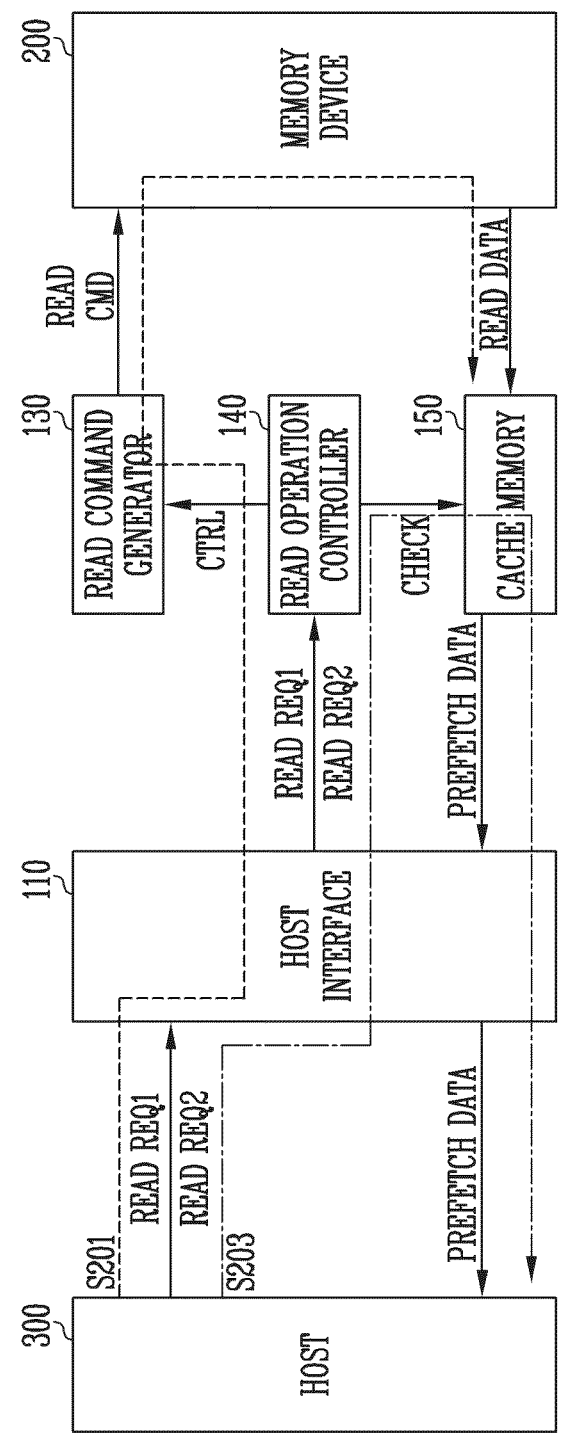
FIG. 2 is a diagram illustrating an example of providing data to a host according to a prefetch operation in accordance with an embodiment of the present disclosure.

FIG. 2 is a diagram illustrating an example of providing data to the host according to a prefetch operation in accordance with an embodiment of the present disclosure.

Referring to FIG. 2, in operation S201, data may be read in advance and the read data may be stored in the cache memory 150.

For example, the host interface 110 may receive a first read request READ REQ1 from the host 300.

The read operation controller 140 may control the memory device 200 to read data corresponding to the first read request READ REQ1 according to the first read request READ REQ1. The data corresponding to the first read request READ REQ1 may be read from the memory device 200 to be provided to the host 300 through the host interface 110.

Meanwhile, the first read request READ REQ1 may be a sequential read request. The read operation controller 140 may control the read command generator 130 to generate read commands READ CMD instructing the memory device 200 to read, in advance, data to be read-requested next.

The read command generator 130 may generate the read commands READ CMD, based on a control signal CTRL from the read operation controller 140. The read command generator 130 may provide the generated read commands READ CMD to the memory device 200.

The memory device 200 may read and output data READ DATA in response to the read commands READ CMD.

The cache memory 150 may store the data READ DATA output from the memory device 200.

In operation S203, data PREFETCH DATA stored in the cache memory 150 may be provided to the host 300 according to a second read request READ REQ2.

For example, the host interface 110 may receive the second read request READ REQ2 from the host 300. The second read request READ REQ2 may be a sequential read request.

The read operation controller 140 may check if data corresponding to the second read request READ REQ2 exists in the cache memory 150 according to the second read request READ REQ2.

When the data corresponding to the second read request READ REQ2 exists, the cache memory 150 may read the data PREFETCH DATA therefrom and provide the read data PREFETCH DATA to the host 300 through the host interface 110. Further, the cache memory 150 may provide cache hit information to the read operation controller 140.

Alternatively, when the data corresponding to the second read request READ REQ2 does not exist, the cache memory 150 may provide cache miss information to the read operation controller 140. The read operation controller 140 may read the data corresponding to the second read request READ REQ2 from the memory device 200 and provide the read data to the host 300.

Figure 3:
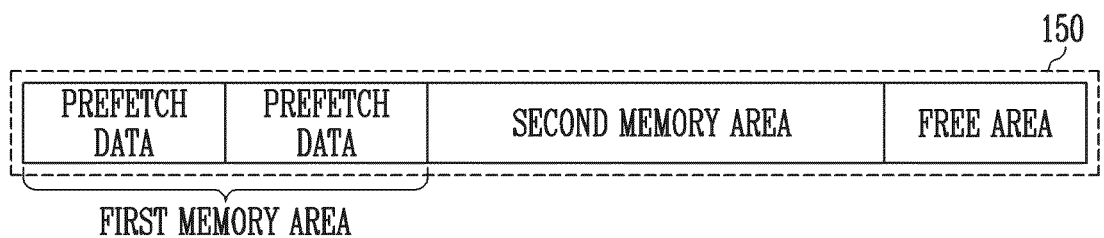
FIG. 3 is a diagram illustrating a cache memory in accordance with an embodiment of the present disclosure.

FIG. 3 is a diagram illustrating the cache memory 150 in accordance with an embodiment of the present disclosure.

Referring to FIG. 3, the cache memory 150 may include at least one of a first memory area, a second memory area, and a free area.

In an embodiment, the first memory area may be an area in which data read in advance from the memory device 200 is stored according to a read command. When the data read in advance is stored in the first memory area, the data may be designated as prefetch data PREFETCH DATA.

In an embodiment, the second memory area may be an area in which data to be read from the memory device 200 is stored according to read commands instructing the memory device 200 to read, in advance, data to be read-requested. Specifically, the second memory area may be an area allocated to store the data to be read from the memory device 200 after the read commands are provided to the memory device 200. When data is read from the memory device 200, the read data may be stored in the second memory device 200.

In an embodiment, the free area may be a remaining area other than the first memory area and the second memory area.

In an embodiment, when the free area exists in the cache memory 150, the read command generator 130 may generate a read command instructing the memory device 200 to read, in advance, data corresponding to a size of the free area. For example, when the free area exists in the cache memory 150, the read command generator 130 may generate a read command instructing the memory device 200 to read, in advance, data to be read-requested before a control signal for suspending generation of the read command is received from the read operation controller 140.

In an embodiment, when the free area does not exist in the cache memory 150, the read command generator 130 may suspend the generation of the read command instructing the memory device 200 to read, in advance, the data to be read-requested.

Figure 4:
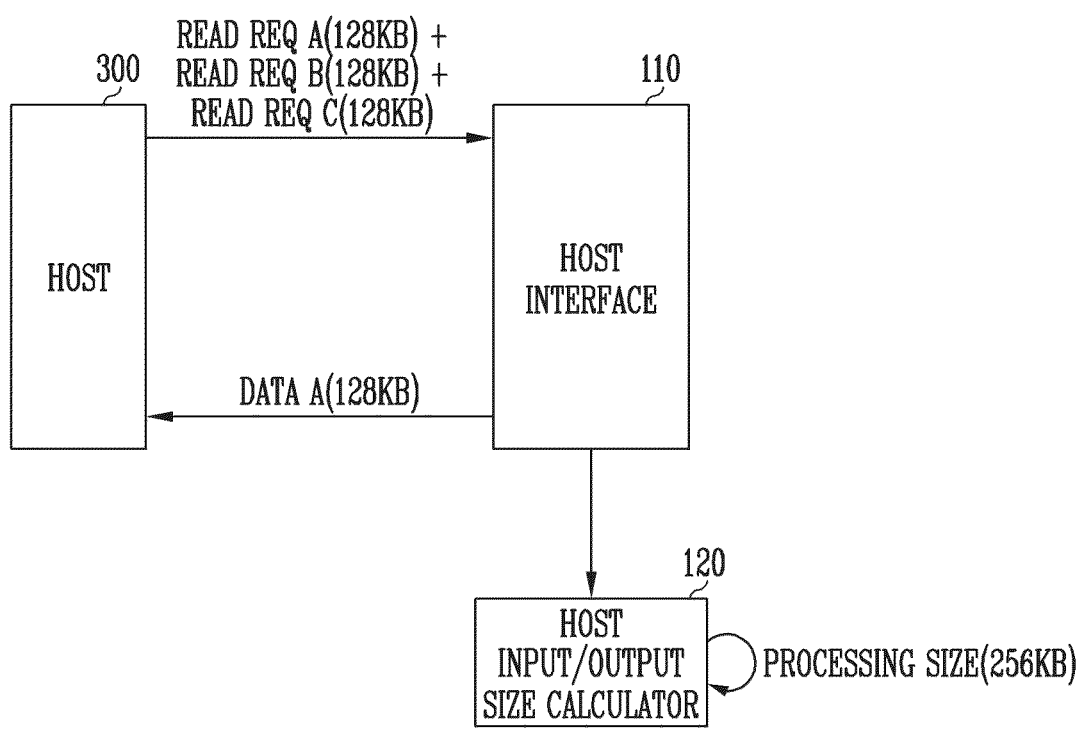
FIG. 4 is a diagram illustrating an example of calculating a size of data being processed according to a plurality of read requests in accordance with an embodiment of the present disclosure.

FIG. 4 is a diagram illustrating an example of calculating a size of data being processed according to a plurality of read requests in accordance with an embodiment of the present disclosure.

Referring to FIG. 4, the host input/output size calculator 120 may calculate a size of the remaining data other than data output to the host 300, among data corresponding to a plurality of read requests of the host 300, as a size of data being processed according to the plurality of requests (hereinafter, referred to as a size 'PROCESSING SIZE').

For example, the host interface 110 may receive, from the host 300, an Ath read request READ REQ A, a Bth read request READ REQ B, and a Cth read request READ REQ C. A size of data corresponding to each of the Ath read request READ REQ A, the Bth read request READ REQ B, and the Cth read request READ REQ C may be 128 KB. A total size of the data read-requested from the host 300 may be 384 KB.

After that, the host interface 110 may output Ath data DATA A to the host 300 in response to the Ath read request READ REQ A. A size of the Ath data DATA A may be 128 KB.

In an embodiment, the host input/output size calculator 120 may calculate 256 KB, obtained by subtracting the size of the Ath data DATA A from the total size of the data read-requested from the host 300, as the size PROCESSING SIZE.

Figure 5:
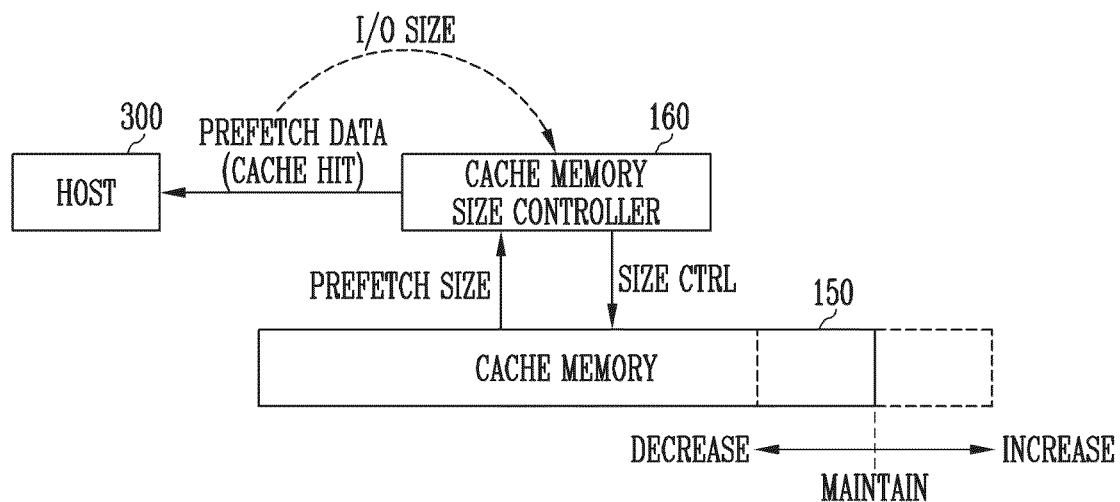
FIG. 5 is a diagram illustrating an example of controlling a size of the cache memory in accordance with an embodiment of the present disclosure.

FIG. 5 is a diagram illustrating an example of controlling a size of the cache memory in accordance with an embodiment of the present disclosure.

Referring to FIG. 5, the cache memory size controller 160 may determine whether a size of the cache memory 150 is sufficient whenever prefetch data PREFETCH DATA is stored in the cache memory 150 according to a cache hit.

For example, the cache memory size controller 160 may optimize the size of the cache memory 150 by determining whether the size of the cache memory 150 is sufficient. A condition of whether the size of the cache memory 150 is sufficient may be determined based on a size of data stored in the cache memory 150 (hereinafter, referred to as a size 'PREFETCH SIZE'), a size of data corresponding to a read request of the host 300 (hereinafter, referred to as a size 'I/O SIZE'), and the like.

In an embodiment, the cache memory size controller 160 may control the size of the cache memory 150 by comparing the size PREFETCH SIZE with the size I/O SIZE. The size of the cache memory 150 may be increased, decreased or maintained based on the size PREFETCH SIZE and the size I/O SIZE.

Figure 6A:
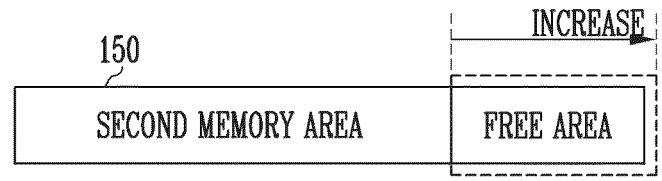
FIG. 6A is a diagram illustrating an example of increasing the size of the cache memory in accordance with an embodiment of the present disclosure.

FIG. 6A is a diagram illustrating an example of increasing the size of the cache memory in accordance with an embodiment of the present disclosure.

Referring to FIG. 6A, when the size PREFETCH SIZE is smaller than the size I/O SIZE, the cache memory size controller 160 may increase the size of the cache memory 150.

For example, when the size PREFETCH SIZE is smaller than the size I/O SIZE (i.e., in a case where PREFETCH SIZE<I/O SIZE), the cache memory size controller 160 may determine that the size of the cache memory 150 is insufficient. Since the cache memory 150 is in a state in which the cache memory 200 is waiting until data is received from the memory device 200, read performance based on the prefetch operation may be deteriorated. Therefore, the cache memory size controller 160 may increase the size of the cache memory 150, thereby securing a free area.

In an embodiment, the cache memory 150 may include a free area having an increased size. The read command generator 130 may generate a read command instructing the memory device 200 to read, in advance, data corresponding to the size of the free area. The generated read command may be provided to the memory device 200.

FIG. 6B is a diagram illustrating an example of decreasing the size of the cache memory in accordance with an embodiment of the present disclosure.

Referring to FIG. 6B, the cache memory size controller 160 may determine whether the size PREFETCH SIZE is greater than a predetermined size whenever data corresponding to each of a plurality of read requests of the host 300 is provided from the cache memory 150 to the host 300 in response to the plurality of read requests. That is, the cache memory size controller 160 may determine whether the size PREFETCH SIZE is greater than the predetermined size whenever a cache hit occurs. When a result obtained by determining that the size PREFETCH SIZE is greater than the predetermined size (i.e., I/O SIZE×n) successively occurs a predetermined number of times 'm' or more, the cache memory size controller 160 may decrease the size of the first memory area in the cache memory 150. 'm' is a positive integer.

In an embodiment, the predetermined size may be set based on a multiple of the size I/O SIZE. For example, the predetermined size may be 'n' times the size I/O SIZE. 'n' is a positive integer.

For example, when a case where the size PREFETCH SIZE is greater than the predetermined size successively occurs the predetermined number of times 'm' or more whenever the cache hit occurs, the cache memory size controller 160 may determine that the size of the cache memory 150 is sufficient. It may be determined that the read performance based on the prefetch operation converges on a maximum value. Thus, the cache memory size controller 160 decreases the size of the cache memory 150, so that memory resources can be optimized.

Since the free area does not exist in the cache memory 150, the read command generator 130 may suspend the generation of the read command instructing the memory device 200 to read, in advance, the data to be read-requested.

Figure 6C:
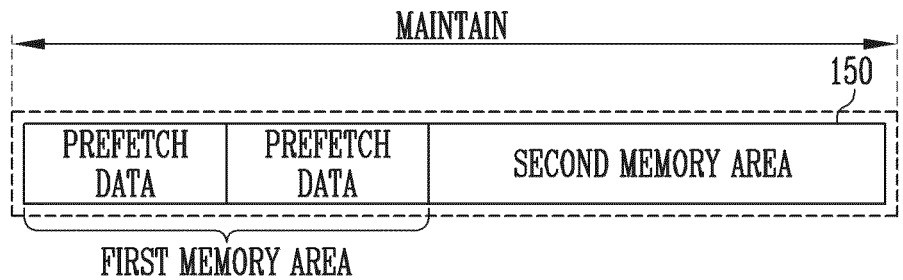
FIG. 6C is a diagram illustrating an example of maintaining the size of the cache memory in accordance with an embodiment of the present disclosure.

FIG. 6C is a diagram illustrating an example of maintaining the size of the cache memory in accordance with an embodiment of the present disclosure.

Referring to FIG. 6C, when the size of the cache memory 150 is optimized (i.e., in a case where I/O SIZE≤PREFETCH SIZE≤(I/O SIZE)×n), the cache memory size controller 160 may maintain a current size of the cache memory 150.

For example, when the size PREFETCH SIZE is equal to or greater than the size I/O SIZE and is equal to or smaller than the predetermined size, the size of the cache memory 150 may be optimized. The read performance based on the prefetch operation may converge on the maximum value, and simultaneously, the memory resources may be optimized. Accordingly, the size of the cache memory 150 may be maintained.

Figure 7:
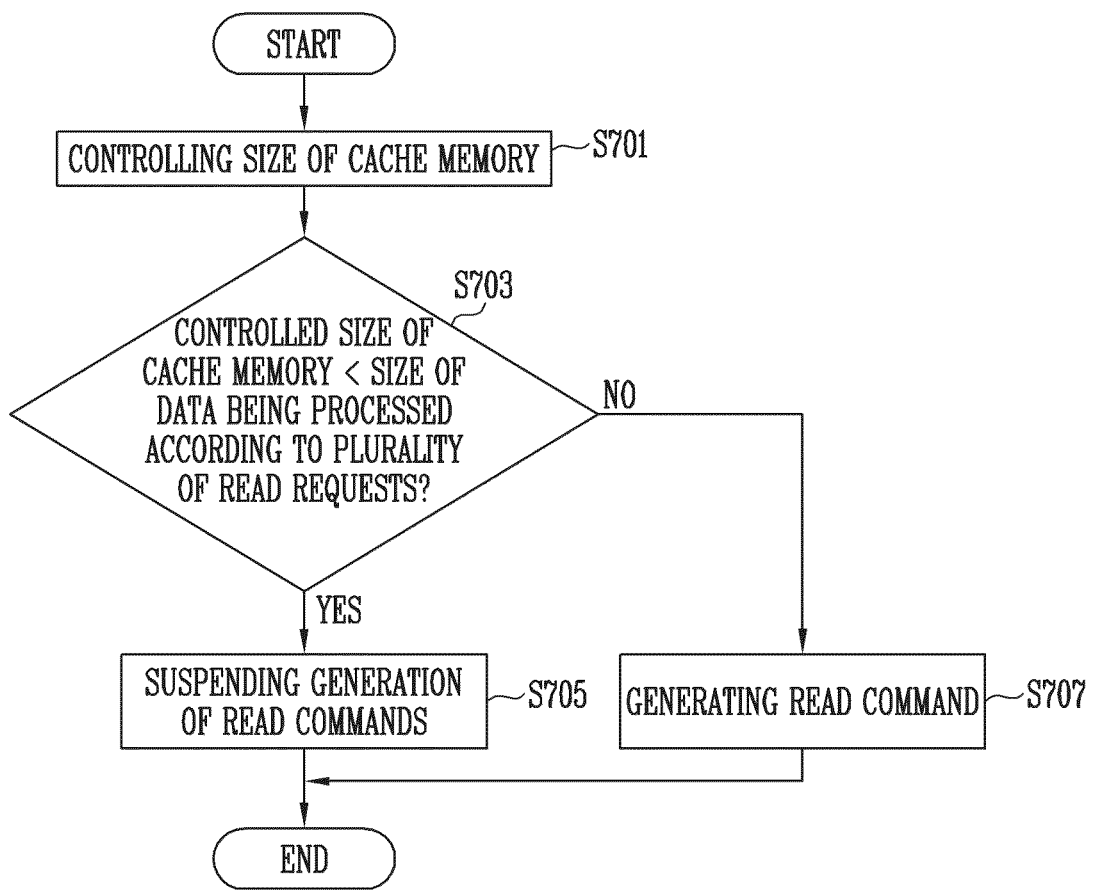
FIG. 7 is a flowchart illustrating a method of determining whether the prefetch operation is to be performed in accordance with an embodiment of the present disclosure.

FIG. 7 is a flowchart illustrating a method of determining whether the prefetch operation is to be performed in accordance with an embodiment of the present disclosure.

The method shown in FIG. 7 may be performed by, for example, the read command generator 130, the read operation controller 140, and the cache memory size controller 160.

Referring to FIG. 7, in operation S701, the cache memory size controller 160 may control a size of the cache memory 150, based on a size of data stored in the cache memory 150 (i.e., PREFETCH SIZE) and a size of data corresponding to a read request of the host 300 (I.e., I/O SIZE).

In an embodiment, the controlled size of the cache memory 150 may represent an optimized size of the cache memory 150. For example, the cache memory size controller 160 may control the size of the cache memory 150 according to the method of controlling the size of the cache memory 150, which is described above with reference to FIGS. 6A to 6C. As described above with reference to FIG. 6C, the size of the cache memory 150 may be in a state in which the size of the cache memory 150 is optimized.

In an embodiment, the controlled size of the cache memory 150 may represent a size of each of a first memory area and a second memory area, which are included in the cache memory 150.

In an embodiment, the read operation controller 140 may determine whether read commands instructing the memory device 200 to read, in advance, data to be read-requested are to be generated, based on a size of data being processed according to a plurality of read requests and the controlled size of the cache memory 150.

For example, in operation S703, the read operation controller 140 may determine whether the size of the data being processed according to the plurality of read requests (i.e., PROCESSING SIZE) is greater than the controlled size of the cache memory 150.

According to a determination result in the operation S703, when the size of the data being processed according to the plurality of read requests is greater than the controlled size of the cache memory 150, in operation S705, the read operation controller 140 may control the read command generator 130 to suspend the generation of the read commands instructing the memory device 200 to read, in advance, the data to be read-requested.

For example, when the size of the data being processed according to the plurality of read requests is greater than the controlled size of the cache memory 150, a parallel processing operation of the memory device 200, such as an interleaving function, may be effectively used. When a read operation is performed through the parallel processing operation of the memory device 200 instead of the prefetch operation, the read performance of the storage device may be further improved. Therefore, the read operation controller 140 may control the prefetch operation to be suspended.

According to a determination result in the operation S703, when the size of the data being processed according to the plurality of read requests is equal to or smaller than the controlled size of the cache memory 150, in operation S707, the read operation controller 140 may control the read command generator 130 to generate read commands instructing the memory device 200 to read, in advance, data to be read-requested.

Meanwhile, the read operation controller 140 may determine whether the generation of the read command is to be resumed after the generation of the read commands is suspended according to the operation S705. For example, the read operation controller 140 may resume the generation of the read commands, based on a size of data corresponding to a read request, whether the read request is a sequential read request or a random read request, a ratio of the read request and a write request for a certain time, and the like.

Figure 8:
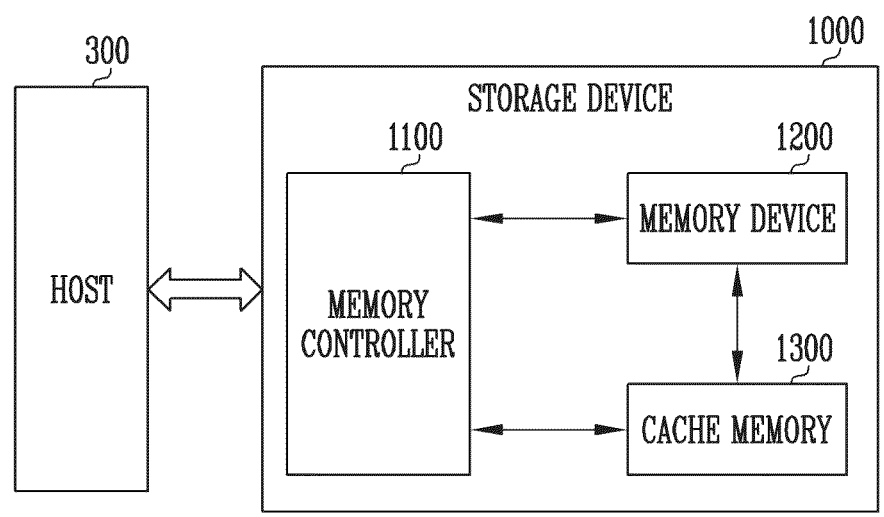
FIG. 8 is a diagram illustrating a storage device in accordance with another embodiment of the present disclosure.

FIG. 8 is a diagram illustrating a storage device in accordance with another embodiment of the present disclosure.

As compared with the storage device 50 shown in FIG. 1, in a storage device 1000 shown in FIG. 8, a cache memory 1300 may exist at the outside of a memory controller 1100 instead of the inside of the memory controller 1100. The operations of the memory controller 100, the memory device 200, the cache memory 150, and the host 300, which are described with reference to FIG. 1, may be similarly applied to the memory controller 110, a memory device 1200, the cache memory 1300, and a host 300, which are shown in FIG. 8.

For example, the memory controller 1100 may prefetch data to be read-requested from the host 300 to the memory device 1200.

The cache memory 1300 may store the prefetched data.

In an embodiment, the memory controller 1100 may control a size of the cache memory 1300, based on a size of data stored in the cache memory 1300 (i.e., PREFETCH SIZE) and a size of data corresponding to a read request of the host 300 (i.e., I/O SIZE).

In an embodiment, the memory controller 1100 may increase or decrease the size of the cache memory 1300, based on the size of the data stored in the cache memory 1300 and the size of the data corresponding to the read request.

For example, when the size of the data stored in the cache memory 1300 is smaller than the size of the data corresponding to the read request, the memory controller 1100 may increase the size of the cache memory 1300. Further, the memory controller 1100 may control the memory device 1200 and the cache memory 1300 to prefetch data corresponding to the increased size of the cache memory 1300.

In another example, when the size of the data stored in the cache memory 1300 is greater than a predetermined size, the memory controller 1100 may decrease the size of the cache memory 1300. Further, the memory controller 1100 may suspend a prefetch operation.

In an embodiment, the memory controller 1100 may determine whether the prefetch operation is to be performed, based on the controlled size of the cache memory 1300. For example, the memory controller 1100 may suspend the prefetch operation when a size of data being processed according to a plurality of read requests (i.e., PROCESSING SIZE) is greater than the controlled size of the cache memory 1300.

In accordance with embodiments of the present disclosure, there can be provided a memory controller capable of improving the performance of a read operation and a storage device including the memory controller.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A memory controller comprising:
a read command generator configured to generate read commands instructing a memory device to read, in advance, data to be read-requested from a host;
a cache memory configured to store data read from the memory device according to the read commands;
a read operation controller configured to receive, from the cache memory, data corresponding to a read request of the host in response to the read request, and output the received data to the host; and
a cache memory size controller configured to control a size of an area assigned for prefetching data in the cache memory, based on a size of the data stored in the cache memory and a precalculated size of the data corresponding to the read request,
wherein the size of the area assigned for prefetching data in the cache memory represents a) a size of remaining data excluding the data corresponding to the read request and b) the precalculated size of the data corresponding to the read request, and
wherein the cache memory size controller determines whether the size of the data stored in the cache memory is greater than a predetermined size whenever data corresponding to each of a plurality of read requests of the host is provided from the cache memory to the host in response to the plurality of read requests, and decreases the size of the area in the cache memory when a result obtained by determining that the size of the data stored in the cache memory is greater than the predetermined size successively occurs a predetermined number of times or more.

2. The memory controller of claim 1, wherein the cache memory includes at least one area among a first memory area in which the data read from the memory device is stored, a second memory area in which data expected to be read from the memory device is to be stored according to the read commands, and a free area.

3. The memory controller of claim 2, wherein, when the free area exists in the cache memory, the read command generator generates a read command instructing the memory device to read, in advance, data corresponding to a size of the free area.

4. The memory controller of claim 1, wherein, when the size of the data stored in the cache memory is smaller than the size of the data corresponding to the read request, the cache memory size controller increases the size of the area in the cache memory.

5. The memory controller of claim 1, wherein the predetermined size is set based on a multiple of the size of the data corresponding to the read request.

6. The memory controller of claim 1, wherein, when a size of data being processed according to a plurality of read request of the host is greater than the controlled size of the area in the cache memory, the read operation controller controls the read command generator to suspend the generation of the read commands.

7. The memory controller of claim 6, wherein the size of the data being processed according to the plurality of read requests represents a size of remaining data other than data output to the host among data corresponding to the plurality of read requests.

8. A memory controller comprising:
a read command generator configured to generate read commands instructing a memory device to read, in advance, data to be read-requested from a host;
a cache memory configured to store data read from the memory device according to the read commands; and
a read operation controller configured to determine whether the read commands are to be generated, based on a precalculated size of data being processed according to a plurality of read requests of the host and a size of an area assigned for prefetching data in the cache memory;
wherein the size of the area assigned for prefetching data in the cache memory is increased or decreased based on a size of the data stored in the cache memory and a size of data output from the cache memory according to a read request of the host,
wherein the size of the area assigned for prefetching data in the cache memory represents a) a size of remaining data excluding the data corresponding to the plurality of read requests and b) the precalculated size of the data corresponding to the plurality of read requests, and
whether the size of the data stored in the cache memory is greater than a predetermined size is determined whenever data corresponding to each of a plurality of read requests of the host is provided from the cache memory to the host in response to the plurality of read requests, and the size of the area in the cache memory is decreased when a result obtained by determining that the size of the data stored in the cache memory is greater than the predetermined size successively occurs a predetermined number of times or more.

9. The memory controller of claim 8, further comprising a host input/output size calculator configured to calculate the size of the data being processed according to the plurality of read requests, based on a difference between a size of data corresponding to the plurality of read requests and a size of data output to the host in response to at least one read request among the plurality of read requests.

10. The memory controller of claim 8, wherein, when the size of the data being processed according to the plurality of read requests is equal to or smaller than the size of the area in the cache memory, the read operation controller controls the read command generator to generate the read commands.

11. The memory controller of claim 8, wherein, when the size of the data being processed according to the plurality of read requests is greater than the size of the area in the cache memory, the read operation controller controls the read command generator to suspend the generation of the read commands.

12. A storage device comprising:
a memory device configured to store data;
a cache memory configured to store data prefetched from the memory device;
a read operation controller configured to receive, from the cache memory, data corresponding to a read request of a host in response to the read request, and output the received data to the host; and
a memory controller configured to control a size of an area assigned for prefetching data in the cache memory, based on a size of the data stored in the cache memory and a precalculated size of the data corresponding to the read request, and determine whether a prefetch operation is to be performed, based on the controlled size of the area in the cache memory, wherein the size of the area assigned for prefetching data in the cache memory represents a) a size of remaining data excluding the data corresponding to the read request and b) the precalculated size of the data corresponding to the read request, and wherein the cache memory size controller determines whether the size of the data stored in the cache memory is greater than a predetermined size whenever data corresponding to each of a plurality of read requests of the host is provided from the cache memory to the host in response to the plurality of read requests, and decreases the size of the area in the cache memory when a result obtained by determining that the size of the data stored in the cache memory is greater than the predetermined size successively occurs a predetermined number of times or more.

13. The storage device of claim 12, wherein the memory controller increases or decreases the size of the area in the cache memory, based on the size of the data stored in the cache memory and the size of the data corresponding to the read request.

14. The storage device of claim 12, wherein when a size of data being processed according to a plurality of read request of the host is greater than the controlled size of the area in the cache memory, the memory controller suspends the prefetch operation.

15. A method of operating a storage device, the method comprising:

controlling a size of an area assigned for prefetching data in a cache memory, based on a size of data stored in the cache memory and a size of data corresponding to a read request of a host;

determining whether a precalculated size of data being processed according to a plurality of read requests is greater than the controlled size of the area in the cache memory;

generating, according to a determination that the precalculated size of the data being processed according to the plurality of read requests is equal to or smaller than the controlled size of the area in the cache memory, read commands to read, in advance, data to be read-requested;

determining, whenever data corresponding to each of the plurality of read requests is provided from the cache memory to the host, whether the size of data stored in the cache memory is greater than a predetermined size; and decreasing the size of the area assigned for prefetching data in the cache memory when a result obtained by the determining that the size of the data stored in the cache memory is greater than the predetermined size successively occurs a predetermined number of times or more, wherein the size of the area assigned for prefetching data in the cache memory is increased or decreased based on a size of the data stored in the cache memory and a size of data output from the cache memory according to a read request of the host, and wherein the size of the area assigned for prefetching data in the cache memory represents a) a size of remaining data excluding the data corresponding to the plurality of read requests and b) the precalculated size of the data corresponding to the plurality of read requests.

16. The method of claim 15, further comprising suspending, according to a determination that the size of the data being processed according to the plurality of read requests is greater than the controlled size of the area in the cache memory, the generation of the read commands.

* * * * *